US012757172B2

(12) United States Patent
Ha et al.

(10) Patent No.: US 12,757,172 B2
(45) Date of Patent: Oct. 6, 2026

(54) METHOD AND APPARATUS FOR MANAGING RESOURCE OF CELL-FREE MASSIVE MULTIPLE INPUT MULTIPLE OUTPUT NETWORK SYSTEM, AND STORAGE MEDIUM STORING INSTRUCTIONS TO PERFORM METHOD FOR MANAGING RESOURCE OF CELL-FREE MASSIVE MULTIPLE INPUT MULTIPLE OUTPUT NETWORK SYSTEM

(71) Applicant: Korea Advanced Institute of Science and Technology, Daejeon (KR)

(72) Inventors: Jeongseok Ha, Daejeon (KR); Hyeonsik Yeom, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 318 days.

(21) Appl. No.: 18/522,606

(22) Filed: Nov. 29, 2023

(65) Prior Publication Data

US 2024/0298300 A1 Sep. 5, 2024

(30) Foreign Application Priority Data

Nov. 30, 2022 (KR) ........................ 10-2022-0165011

(51) Int. Cl.
*H04W 72/044* (2023.01)
*H04B 7/0452* (2017.01)
(Continued)

(52) U.S. Cl.
CPC ........ *H04W 72/044* (2013.01); *H04B 7/0452* (2013.01); *H04W 52/267* (2013.01); *H04W 52/42* (2013.01)

(58) Field of Classification Search
CPC . H04W 72/044; H04W 52/267; H04W 52/42; H04W 28/18; H04W 72/0473;
(Continued)

(56) References Cited

U.S. PATENT DOCUMENTS 11,223,396 B2 * 1/2022 Kim ...................... H04L 5/0007
2012/0163433 A1 * 6/2012 Koike-Akino ........ H04W 28/04 375/220

(Continued)

FOREIGN PATENT DOCUMENTS

EP 4002730 A1 * 5/2022 ............ H04W 72/54

OTHER PUBLICATIONS

Giuseppe Caire, "On the ergodic rate lower bounds with applications to massive MIMO", and the IEEE Trans. wireless Communications, vol. 17, Oct. 25, 2017 (Year: 2017).*

(Continued)

*Primary Examiner* — Kathy W Wang-Hurst
*Assistant Examiner* — Eric M. Vo
(74) *Attorney, Agent, or Firm* — NKL LAW; Jae Youn Kim

(57) ABSTRACT

There is provided a resource management method to be processed by a resource management apparatus in a cell-free massive MIMO network system. The method comprises receiving communication information from an access point; allocating transmission power information based on the communication information; setting scheduling information of the access point based on the transmission power information; receiving device data of a user terminal from the access point based on the scheduling information; and decoding the received device data.

13 Claims, 9 Drawing Sheets

(51) Int. Cl.
*H04W 52/26* (2009.01)
*H04W 52/42* (2009.01)

(58) Field of Classification Search
CPC .. H04W 72/535; H04B 7/0452; H04B 7/0413
See application file for complete search history.

(56) References Cited

U.S. PATENT DOCUMENTS

| | | | | |
|---|---|---|---|---|
| 2021/0028830 | A1* | 1/2021 | Kim | H04W 72/0453 |
| 2022/0190890 | A1* | 6/2022 | Alkhateeb | H04B 7/0452 |
| 2023/0180146 | A1* | 6/2023 | Takeda | H04W 52/146<br>455/522 |

OTHER PUBLICATIONS

Giuseppe Caire, "On the ergodic rate lower bounds with applications t o massive MIMO", IEEE Trans. Wireless Communications, vol. 17, No. 5, pp. 3258-3268 (Oct. 25, 2017).

* cited by examiner

METHOD AND APPARATUS FOR MANAGING RESOURCE OF CELL-FREE MASSIVE MULTIPLE INPUT MULTIPLE OUTPUT NETWORK SYSTEM, AND STORAGE MEDIUM STORING INSTRUCTIONS TO PERFORM METHOD FOR MANAGING RESOURCE OF CELL-FREE MASSIVE MULTIPLE INPUT MULTIPLE OUTPUT NETWORK SYSTEM

This work was supported by National Research Foundation of Korea (NRF) grant funded by the Korea government (MSIP; Ministry of Science, ICT and Future Planning) (NRF-2021R1A2B5B01002204).

TECHNICAL FIELD

The present disclosure relates to multiple-input multiple-output (MIMO), and relates to a cell-free massive MIMO network.

BACKGROUND

In a cell-free massive MIMO network, power and AP (access point) scheduling is an essential resource, and in the existing cell-free massive MIMO network, all technologies relating to performance evaluation and resource allocation have been conducted under the assumption that the channel hardening effect is enough.

However, it was recently proven that the channel hardening effect rarely occurs because APs are distributed over a cell-free massive MIMO network.

Accordingly, the research and development of a new resource allocation technique that does not require the assumption that channel hardening occurs are essentially needed.

SUMMARY

An embodiment of the present disclosure proposes a power allocation and AP scheduling technique for providing fair performance to receivers using a single antenna in an up-link cell-free massive MIMO system.

An embodiment of the present disclosure proposes a new measure that improves the problems with the existing performance evaluation, and, based on this, proposes a power allocation and AP scheduling technique for providing uniform performance to every user.

An embodiment of the present disclosure proposes a power allocation and AP scheduling technique for improving fairness based on a measure for performance evaluation without channel hardening.

The aspects of the present disclosure are not limited to the foregoing, and other aspects not mentioned herein will be clearly understood by those skilled in the art from the following description.

In accordance with an aspect of the present disclosure, there is provided a resource management apparatus in a cell-free massive MIMO (Multi-Input Multi-Output) network system, the apparatus comprises: a transceiver configured to receive communication information from access points distributed on a fronthaul network of the cell-free massive MIMO network system; a controller configured to control the transceiver to allocate transmission power information based on the communication information, set access point scheduling information based on the transmission power information, and transmit the transmission power information and the access point scheduling information to the access points, wherein the controller is configured to receive data of a user terminal based on the access point scheduling information; and decode the received data.

Herein, the apparatus may include a memory configured to store an algorithm for allocating the transmission power information and scheduling the access point scheduling information, a power allocation unit configured to load the algorithm selected by the controller to allocate the transmission power information, and a scheduling unit configured to load the algorithm selected by the controller to set the access point scheduling information.

Additionally, the controller may be configured to calculate a lower bound on an Ergodic transmission rate without channel hardening through the algorithm, and allocate the transmission power information based on the calculated lower bound.

Additionally, the controller may be configured to obtain the lower bound on the Ergodic transmission rate in a closed-form expression.

Additionally, the controller may be configured to calculate an average ratio between an UatF (Use-and then Forget) lower bound and the lower bound of the Ergodic transmission rate.

Additionally, the processor may be configured to set the access point scheduling information by setting a local optimum based on the transmission power information.

Additionally, the communication information may include at least one of location information of the user terminal, information on a channel estimation scheme of the access point, and maximum transmission power.

In accordance with another aspect of the present disclosure, there is provided a resource management method to be processed by a resource management apparatus in a cell-free massive MIMO network system, the method comprises: receiving communication information from an access point; allocating transmission power information based on the communication information; setting scheduling information of the access point based on the transmission power information; receiving device data of a user terminal from the access point based on the scheduling information; and decoding the received device data.

Herein, the device data may be generated by transmitting data by the user terminal based on the transmission power information.

Additionally, the allocating the transmission power information may include calculating a lower bound on an Ergodic transmission rate without channel hardening; and allocating the transmission power information based on the calculated lower bound on the Ergodic transmission rate.

Additionally, the calculating the lower bound on the Ergodic transmission rate may include obtaining the lower bound on the Ergodic transmission rate in a closed-form expression.

Additionally, the calculating the lower bound on the Ergodic transmission rate may include calculating an average ratio between an UatF lower bound and the lower bound of the Ergodic transmission rate.

Additionally, the setting scheduling information may include setting the access point scheduling information by setting a local optimum based on the transmission power information.

Additionally, the communication information may include at least one of location information of the user terminal, information on a channel estimation scheme of the access point, and maximum transmission power.

In accordance with another aspect of the present disclosure, there is provided a non-transitory computer readable storage medium storing computer executable instructions, wherein the instructions, when executed by a processor, cause the processor to perform a resource management method, the method comprise receiving communication information from an access point; allocating transmission power information based on the communication information; setting scheduling information of the access point based on the transmission power information; transmitting the transmission power information and the scheduling information to the access point; receiving device data of a user terminal from the access point based on the scheduling information; and decoding the received device data.

In accordance with another aspect of the present disclosure, there is provided computer program including computer executable instructions stored in a non-transitory computer readable storage medium, wherein the instructions, when executed by a processor, cause the processor to perform a data transmission method, the method comprises: receiving communication information from an access point; allocating transmission power information based on the communication information; setting scheduling information of the access point based on the transmission power information; transmitting the transmission power information and the scheduling information to the access point; receiving device data of a user terminal from the access point based on the scheduling information; and decoding the received device data.

An embodiment of the present disclosure proposes a realistic measure for performance evaluation that does not assume the channel hardening effect which rarely occurs in a cell-free massive MIMO network, and proposes a power allocation and AP scheduling scheme for improving fairness that uses this measure.

The present disclosure is capable of more realistic performance evaluation by making up for loss caused by using the existing measure for performance evaluation and achieving an improvement in fairness performance through effective resource distribution.

The present disclosure is expected to make a large contribution to 6G communication standardization and commercialization because it has dealt with a cell-free massive MIMO system which is currently attracting the greatest attention in the field of wireless communication network studies.

DETAILED DESCRIPTION

Figure 1:
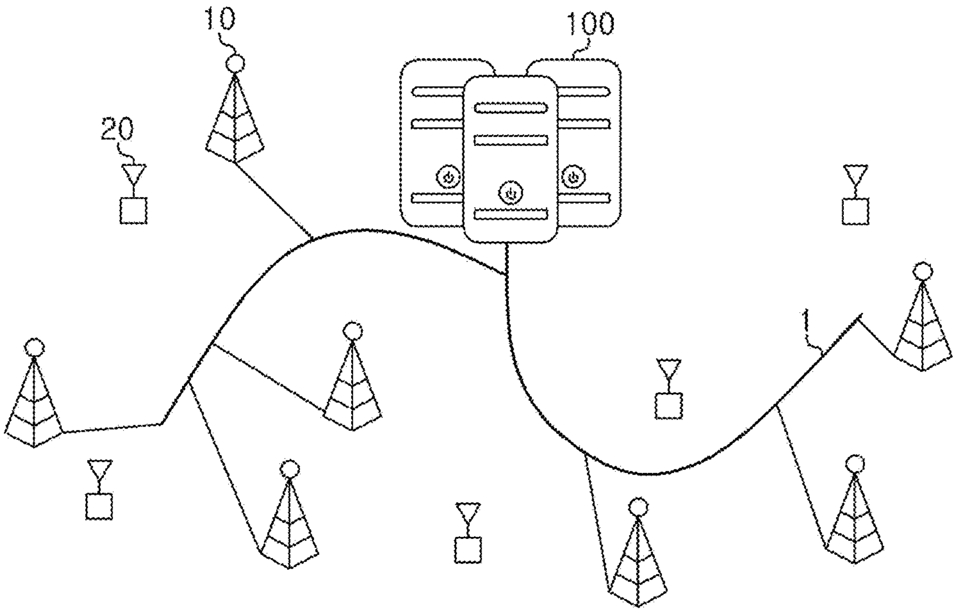
FIG. 1 is a conceptual diagram of a cell-free massive MIMO network system applied to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In the description of the embodiments, the detailed description of related known functions or constructions will be omitted herein to avoid obscuring the subject matter of the present invention. In addition, terms which will be described below are defined in consideration of functions in the embodiments of the present invention, and may vary with an intention of a user and an operator or a custom. Accordingly, the definition of the terms should be determined based on the overall content of the specification.

To meet the needs for a variety of applications in future communication environments, for example, 6G communication environments, it is necessary to secure a breakthrough and meaningful communication capacity. However, in existing cellular networks, users on cell boundaries have a smaller potential communication capacity due to much interference. To solve this problem, a cell-free massive MIMO network is proposed.

A cell-free massive MIMO network is a network that combines the concepts of a network MIMO, a DAS (distributed antenna system), and a massive MIMO, and has the feature of providing service to a user in cooperation among a large number of APs distributed within the network without the concept of cells.

It was proved by tests that the cell-free massive MIMO network has all of the aforementioned three benefits of the technology and is therefore able to provide relatively highly uniform service to every user compared to small-cell networks.

However, doubts have been recently raised about the channel hardening effect, which is one of the benefits of the cell-free MIMO network, and studies have suggested that the channel hardening assumption is not appropriate due to the distribution of APs.

Accordingly, the research and development of a new performance evaluation measure and resource distribution method that do not assume the channel hardening effect are necessary, as opposed to the existing performance evaluation measure and resource distribution method which assume the channel hardening effect.

In this regard, an embodiment of the present disclosure proposes a power allocation and AP scheduling technique for improving fairness based on a measure for performance evaluation without channel hardening, provides fair performance to receivers using a single antenna, especially in an up-link cell-free massive MIMO system, proposes a new measure that improves the problems with the existing performance evaluation, and, based on this, proposes a power allocation and AP scheduling technique for providing uniform performance to every user.

Moreover, an embodiment of the present disclosure proposes a new measure for performance evaluation based on information theory. Based on this, the power allocation and AP scheduling scheme for improving fairness proposes an algorithm about resource distribution based on convex optimization. The performances of the proposed scheme and the existing scheme assuming the channel hardening effect will be compared by a test.

Hereinafter, an embodiment of the present disclosure will be described in detail with reference to the accompanying drawings.

FIG. 1 is a conceptual diagram of a cell-free massive MIMO network system applied to an embodiment of the present disclosure. The cell-free massive MIMO network system may include a plurality of access points 10, a plurality of user terminals 20, and a resource management apparatus 100.

An embodiment of the present disclosure proposes a more accurate measure for performance evaluation that does not assume the channel hardening effect, and based on this, proposes a resource allocation and access point scheduling scheme for maximizing fairness.

As depicted in FIG. 1, the cell-free massive MIMO network system is for uplink, and M access points 10 having N antennas and K user terminals 20 having a single antenna are distributed within a fronthaul network 1, and the resource management apparatus 100 according to the embodiment of the present disclosure may be connected via the fronthaul network 1.

Figure 2:
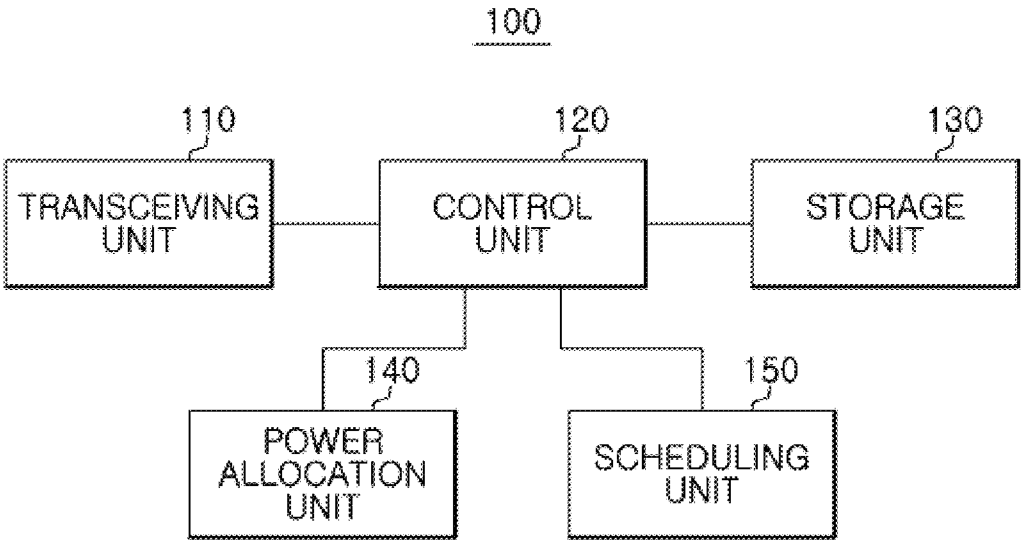
FIG. 2 is a block diagram of a resource management apparatus 100 for a cell-free massive MIMO network system according to an embodiment of the present disclosure.

FIG. 2 is a block diagram of a resource management apparatus 100 for a cell-free massive MIMO network system according to an embodiment of the present disclosure.

The resource management apparatus 100 according to the embodiment of the present disclosure may include a transceiving unit 110, a control unit 120, a storage unit 130, a power allocation unit 140, and a scheduling unit 150.

The transceiving unit 110 may receive information on a communication system, send allocated power information and configured access point scheduling information based on the received communication system information, and receive a user terminal's data based on the access point scheduling information.

The control unit 120 may control the power allocation unit 140 to allocate transmission power based on the communication system information received through the transceiving unit 110, and may control the scheduling unit 150 to configure access point scheduling information based on the allocated transmission power.

Moreover, the control unit 120 may control the transceiving unit 110 to transmit the power information allocated through the power allocation unit 140 and the access point scheduling information configured through the scheduling unit 150.

In addition, upon receiving user terminal data through the transceiving unit 110, the control unit 120 may decode the user terminal data.

The storage unit 130 may be connected to the control unit 120, and the storage unit 130 may store an algorithm for power allocation and access point scheduling. This algorithm may be selected by the control unit 120 and loaded onto the power allocation unit 140 and the scheduling unit 150.

Figure 3:
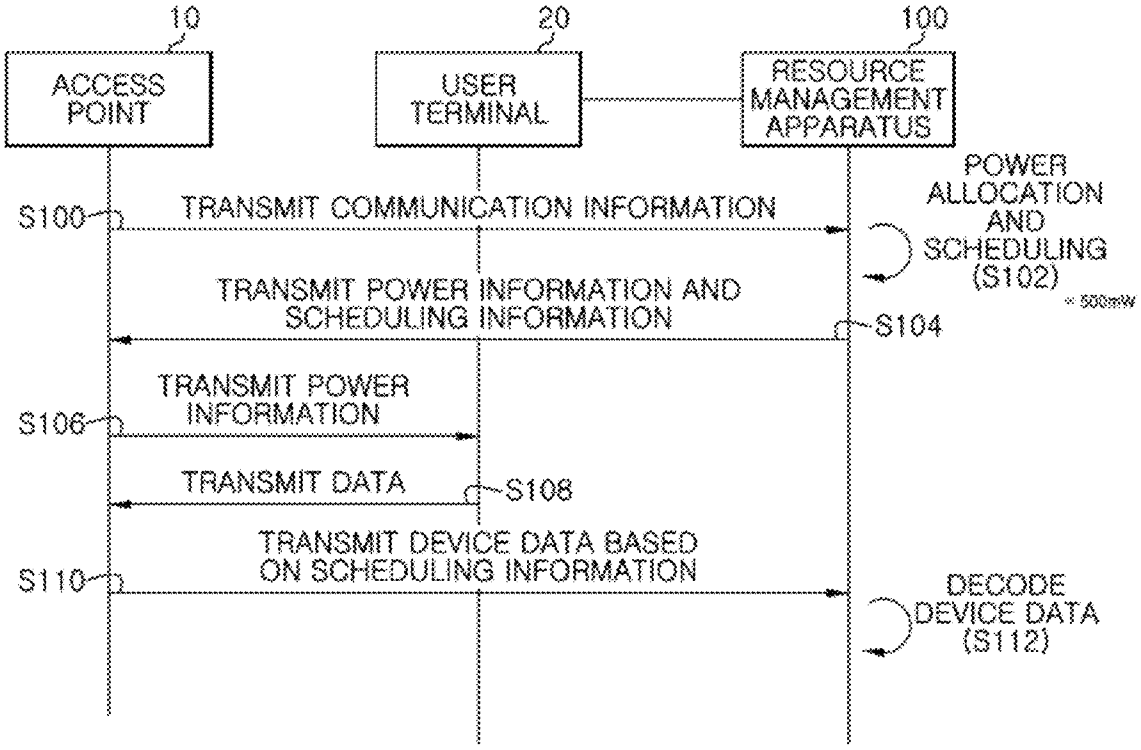
FIG. 3 is a time chart illustrating a resource management method for the resource management apparatus 100 in a cell-free massive MIMO network system according to an embodiment of the present disclosure, which is an exemplary drawing illustrating a data transmission process for a shared power allocation and access point scheduling scheme for improving fairness in an uplink cell-free massive MIMO network system.

FIG. 3 is a time chart illustrating a resource management method for the resource management apparatus 100 in a cell-free massive MIMO network system according to an embodiment of the present disclosure, which is an exemplary drawing illustrating a data transmission process for a shared power allocation and access point scheduling scheme for improving fairness in an uplink cell-free massive MIMO network system.

As depicted in FIG. 3, the power management apparatus 100 may receive communication information related to a fundamental communication system from an access point 10 (S100). Such communication information may include at least one of location information of a user terminal 20, information on a channel estimation scheme of the access point 10, and maximum transmission power information.

Upon receiving communication information, the resource management apparatus 100 may allocate transmission power based on a stored algorithm and temporarily store information on the allocated transmission power. Also, the resource management apparatus 100 may configure access point scheduling information based on the information on the allocated transmission power and temporarily store the configured access point scheduling information (S102).

Once the transmission power is allocated, and the access point scheduling information is configured, the resource management apparatus 100 may transmit the allocated transmission power information and the configured access point scheduling information to the access point 10 (S104).

Afterwards, the user terminal 20 may receive transmission power information for each user terminal from the access point 10 (S106), and the user terminal 20 may send terminal data based on the received transmission power information (S108).

Thereafter, the access point 10 may transmit the terminal data received from the user terminal 20 to the resource management apparatus 100 based on the access point scheduling information received from the resource management apparatus 100 (S110).

Once the terminal data is transmitted to the resource management apparatus 100, the resource management apparatus 100 may decode the received terminal data (S112).

Hereinafter, the resource management method for the resource management apparatus 100 in a cell-free massive MIMO network system according to an embodiment of the present disclosure will be described in more details with reference to equations.

First, the access point 10 exchanges signals with the resource management apparatus 100 via a backhaul link, in which case it is assumed that there is no error in exchanging information via the backhaul link. In this cell-free massive MIMO network system, it is assumed that uplink data transmission and downlink data transmission operate in TDD (time division duplex) mode. Also, only uplink pilot signals are transmitted, and no downlink pilot signals exist. The channel is assumed to be a block-fading channel.

A channel between an m-th access point and a k-th user terminal can be expressed by the following [Equation 1]:

$$g_{mk}[n] = \sqrt{\beta_{mk}}\, h_{mk}[n] \in \mathbb{C}^{N\times 1} \quad \text{[Equation 1]}$$

where $\beta_{mk}$ is large-scale fading, and $h_{mk}[n]$ is small-scale fading. In the present disclosure, Rayleigh fading is assumed, and it is assumed that a small-scale fading element has i.i.d. Gaussian (independent identically distributed Gaussian) distribution. Thus, it is assumed that the average is zero, and the covariance has an identity matrix.

Each user transmits a pilot signal to the access point 10 before starting an uplink data transmission process. The pilot signal is a signal the access point 10 uses to estimate instantaneous channel information with the user terminal 20. In this case, each access point 10 estimates a channel from the received pilot signal through an LMMSE (linear maximize mean square error) estimator. This assumption is a channel estimator that has low complexity in wireless communication and shows good performance, which is a widely used assumption. The estimated channel $\hat{g}_{mk} \sim CN(0, \gamma_{mk} \cdot I_N)$ distribution $\gamma_{mk}$ can be expressed by the following [Equation 2]:

$$\gamma_{mk} = \frac{\tau_p \rho_p \beta_{mk}^2}{\tau_p \rho_p \beta_{mk} + \tau_p \rho_p \sum_{k' \neq k} \beta_{mk'} \left|\varphi_{k'}^T \varphi_k^*\right|^2 + \sigma_P^2} \quad \text{[Equation 2]}$$

where $\tau_p$ is the number of symbols allocated for pilot transmission, $\rho_p$ is the transmission power used for pilot transmission, $\varphi_k$ is a pilot signal the k-th user terminal 20, and $$\sigma_P^2$$

is the distribution of a thermal (AWGN) signal of a pilot receiver.

In an uplink data transmission interval, each user terminal 20 transmits its own information to the access point 10. In this case, the signal transmitted by the k-th user terminal 20 is expressed by [Equation 3]:

$$x_k[1:\tau_u] = \sqrt{\rho_u \eta_k}\, q_k[1:\tau_u] \in \mathbb{C}^{1\times \tau_u} \quad \text{[Equation 3]}$$

where $\rho_u$ is the maximum power for each user terminal 20 available for uplink data transmission, $0 \leq \eta_k \leq 1$ is the ratio of transmission power of the k-th user terminal 20, $q_k \sim CN(0,1)$ is the signal transmitted by the k-th user terminal 20, and $\tau_u$ is the number of symbols used for uplink data transmission.

Each access point 10 receives signals sent by every user terminal 20 within the network. A signal received by the m-th access point 10 can be expressed by [Equation 4]:

$$y_m[1:\tau_u] = \sum_{k=1}^{K} g_{mk} x_k[1:\tau_u] + W_m[1:\tau_u] = \sum_{k=1}^{K} \sqrt{\rho_u \eta_k}\, g_{mk} q_k[1:\tau_u] + W_m[1:\tau_u] \quad \text{[Equation 4]}$$

where $$w_m \sim CN(0, \sigma_w^2 I_N)$$

is thermal noise in the access point 10.

To decode the information of the user terminal 20, each access point 10 transmits signal to the resource management apparatus 100 through conjugate beamforming based on an estimated channel. A signal received by the resource management apparatus 100 to decode the information of the k-th user terminal 20 can be expressed by the following [Equation 5]:

$$r_k[1:\tau_u] = \sum_{m=1}^{M} C_{mk} V_{mk}^H y_m[1:\tau_u] = \sum_{m=1}^{M} C_{mk} \hat{G}_{mk}^H y_m[1:\tau_u] = \sum_{m=1}^{M} F_{k,k'} q_{k'}[1:\tau_u] + n_k[1:\tau_u] \quad \text{[Equation 5]}$$

where $f_{k,k'}$ is an effective channel for a k'-th user terminal 20, when decoding the signal from the k-th user terminal 20, and $n_k$ is thermal noise after conjugate beamforming when k-th user terminal 20 decodes the signal from the user terminal 20. This can be expressed by [Equation 6]:

$$f_{k,k'} = \sum_{m=1}^{M} \sqrt{\rho_u \eta_{k'}}\, C_{mk} \hat{G}_{mk}^H \hat{G}_{mk'} \quad \text{[Equation 6]}$$

$$n_k[1:\tau_u] = \sum_{m=1}^{M} C_{mk} \hat{G}_{mk}^H W_m[1:\tau_u]$$

where Cmk is a parameter indicating a connection between the user terminal 20 and the access point 10. If the m-th access point 10 is used to decode the information of the k-th user terminal 20, Cmk=1. Otherwise, Cmk=0.

Since the uplink cell-free massive MIMO network system does not use a downlink pilot, the ergodic data transmission rate for the k-th user terminal 20 in a block-fading channel model is defined by [Equation 7]:

$$R_k = \frac{1}{\tau_u} I\left(q_k[1:\tau_u]; r_k[1:\tau_u]\right) \quad \text{[Equation 7]}$$

where I(•:•) represents mutual information). A closed-form expression in [Equation 7] is still an open problem. Thus, many of the existing studies have counted on channel hardening-based UatF (Use-and-then-Forget) lower bounds, but the recent evidence shows that the channel hardening effect occurs rarely in a cell-free massive MIMO network environment. Accordingly, a new bound regardless of channel hardening is required.

The present disclosure first discovers a lower bound on ergodic data transmission rate without channel hardening assumption, and using this, proposes a power allocation and access point scheduling scheme for improving fairness.

By applying the chain rule for mutual information to the ergodic transmission rate achievable by the user terminal 20, that is, [Equation 7], the chain rule can be expressed by [Equation 8]:

[Equation 8]

$$\frac{1}{\tau_u} I(q_k[1:\tau_u]; r_k[1:\tau_u]) = \frac{1}{\tau_u}\Big[I(\{g_{k,k'}, g_{\hat{k},k'}\}; r_k[1:\tau_u]\}\Big) + I(q_k[1:\tau_u]; r_k[1:\tau_u] | \{g_{k,k'}, g_{\hat{k},k'}\}) - I(\{g_{k,k'}, g_{\hat{k},k'}\}; r_k[1:\tau_u] | q_k[1:\tau_u])\Big] \le \frac{1}{\tau_u}[I(q_k[1:\tau_u]; r_k[1:\tau_u] | \{g_{k,k'}, g_{\hat{k},k'}\}) - I(\{g_{k,k'}, g_{\hat{k},k'}\}; r_k[1:\tau_u] | q_k[1:\tau_u])]$$

where the last inequality holds since the mutual information is always negative. Afterwards, the first term in [Equation 8] will be calculated and expressed by the following [Equation 9]:

[Equation 9]

$$I(\{g_{k,k'}, g_{\hat{k},k'}\}; r_k[1:\tau_u]) = \tau_u \mathbb{E}_{-}\{f_{k,k'}\}\left[\log_2\left(1 + \frac{|f_{k,k'}|^2}{\sum_{k'}|f_{k,k'}|^2 + \left|\sum_m^M C_{mk} g_{\hat{m}k}\right|^2 \sigma_w^2}\right)\right]$$

The reason why the above expression is possible is that, when the effective channel is all given, the received signal is Gaussian, in which case the above equal sign holds.

Next, by using the definition of mutual information, the second term in [Equation 8] can be expressed by the following [Equation 10]:

[Equation 10]

$$I(\{g_{k,k'}, g_{\hat{k},k'}\}; r_k[1:\tau_u] | q_k[1:\tau_u]) = h(r_k[1:\tau_u] | q_k[1:\tau_u]) - h(r_k[1:\tau_u] | q_k[1:\tau_u], \{g_{k,k'}, g_{\hat{k},k'}\})$$

Utilizing an upper bound of [Equation 10] in [Equation 8] is equivalent to finding a lower bound of [Equation 8]. Thus, to find an upper bound of [Equation 10], the upper bound for the first term can be calculated by the following [Equation 11]:

[Equation 11]

$$h(r_k[1:\tau_u] | q_k[1:\tau_u]) \le \tau_u \log_2\left(\sum_{k' \ne k} \mathbb{E}\left[|f_{k,k'}|^2 + \mathbb{E}\left[\left|\sum_{m-1}^{M} C_{mk} g_{\hat{m}k}^H\right|^2\right]\sigma_w^2 + \log_2\left(1 + \frac{\tau_u \mathbb{V}[f_{k,k}]}{\sum_{k' \ne k}\mathbb{E}\left[|f_{k,k'}|^2 + \mathbb{E}\left[\left|\sum_{m=1}^{M} C_{mk} g_{\hat{m}k}^H\right|^2\right]\sigma_w^2\right]}\right) + \log_2(e\pi)\right.\right.$$

The above inequality holds because the Gaussian distribution has the highest information entropy among random variables with the same distribution. Next, the second term for [Equation 10] can be expressed by the following [Equation 12]:

[Equation 12]

$$h(r_k[1:\tau_u] | q_k[1:\tau_u], \{g_{k,k'}, g_{\hat{k},k'}\}) = \tau_u \mathbb{E}\left[\log_2\left(\sum_{k' \ne k} \mathbb{E}\left[|f_{k,k'}|^2 + \mathbb{E}\left[\left|\sum_{m=1}^{M} C_{mk} g_{\hat{m}k}^H\right|^2\right]\sigma_w^2\right) + \tau_u \log_2(e\pi)\right.\right.$$

The above equality holds because the received signal has a Gaussian distribution when the effective channel and the information on the k-th user terminal 20 are given. By using the above [Equation 8]~[Equation 12], a lower bound $$R_k^{Prop}$$

for the ergodic transmission rate of the k-th user terminal 20 can be obtained by the following [Equation 13]:

[Equation 13]

$$R_k \ge R_k^{Prop} = \mathbb{E}\left[\log_2\left(\frac{|f_{k,k'}|^2 + \sum_{k' \ne k}|f_{k,k'}|^2 + \left|\sum_m^M C_{mk} g_{\hat{m}k}\right|^2 \sigma_w^2}{\sum_{k' \ne k}\mathbb{E}\left(\left[|f_{k,k'}|^2 + \mathbb{E}\left[\left|\sum_{m=1}^{M} C_{mk} g_{\hat{m}k}^H\right|^2\right]\sigma_w^2\right)\right.}\right)\right] - \frac{1}{\tau_u}\log_2\left(1 + \frac{\tau_u \mathbb{V}[f_{k,k'}]}{\sum_{k' \ne k}\mathbb{E}|f_{k,k'}|^2 + \mathbb{E}\left[\left|\sum_{m=1}^{M} C_{mk} g_{\hat{m}k}^H\right|^2\right]\sigma_w^2}\right)$$

The proposed lower bound does not have the problems the existing UatF lower bound have since it does not rely on channel hardening. For the comparison between the proposed lower bound and the existing UatF lower bound, simulation was carried out in various environments based on two measures.

The first measure is the average ratio between the two lower bounds, which can be given by the following [Equation 14]:

$$\omega = \mathbb{E}\left[\frac{R_k^{Prop}}{R_k^{UatF}}\right] \quad \text{[Equation 14]}$$

where $$R_k^{UatF}$$

is the existing UatF lower bound on the k-th user's ergodic transmission rate, and $$R_k^{Prop}$$

is a lower bound on the k-th user's ergodic transmission rate according to an embodiment of the present disclosure. The average difference between the two bounds can be found through a measure according to an embodiment of the present disclosure. However, it is difficult to evaluate the appropriateness of the proposed lower bound by this measure alone, since the measure according to the embodiment of the present disclosure uses average values. Thus, the second measure as in the following [Equation 15] is used.

$$Q = Pr\left[R_k^{Prop} > R_k^{UatF}\right] \quad \text{[Equation 15]}$$

The second measure represents the probability that the proposed bound will reflect actual values better than the existing UatF lower bound does.

Figure 4:
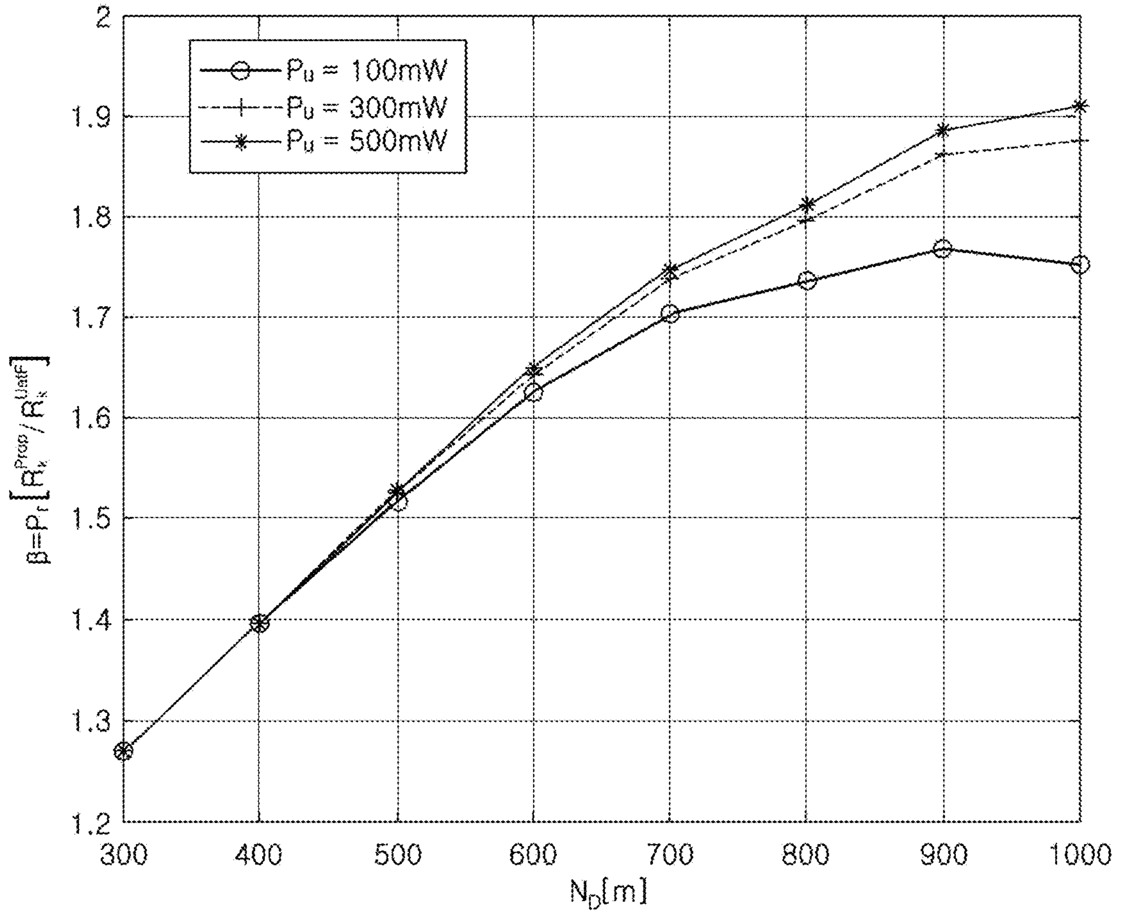
FIG. 4 is a graph showing the network size-dependent average ratio between a measure according to an embodiment of the present disclosure and a conventional measure.
Figure 5:
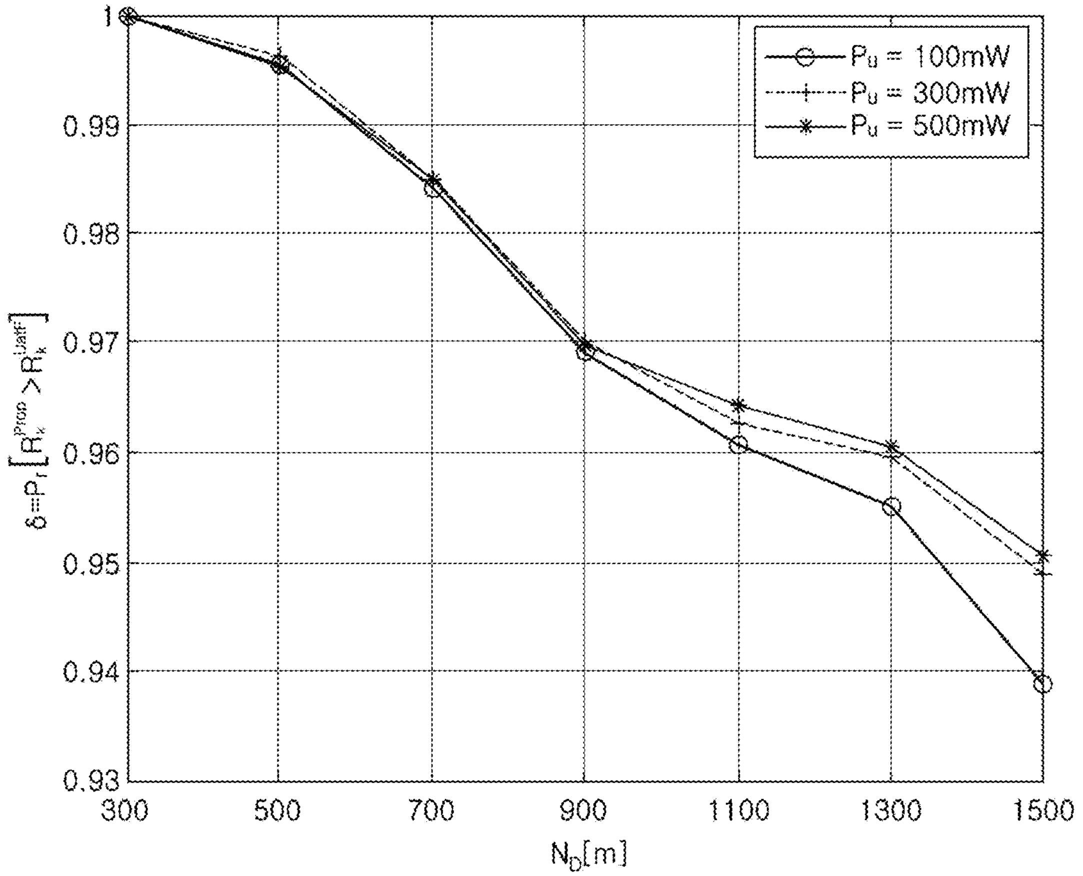
FIG. 5 is a graph showing the network size-dependent ratio at which the measure according to the embodiment of the present disclosure is more suitable than the conventional measure.

The aforementioned two measures are illustrated in FIGS. 4 and 5. The transmission power of each user terminal 20 uses a heuristic power allocation technique for improving fairness performance in uplink cell-free massive MIM, and it is assumed that an access point has a total of 200 single antennas and a user terminal has 20 single antennas. The test environment not described in details here will be described in details in the last part of this specification.

Referring to FIG. 4, it can be seen that the ratio between the lower bound according to an embodiment of the present disclosure and the UatF lower bound varies with network size. With a network size assumed usually in cell-free massive MIMO, it can be seen that @ all has a larger value than 1. This means that the lower bound according to an embodiment of the present disclosure has a higher value on average. That is, this lower bound reflects actual values better. It can be seen that the lower bound proposed through FIG. 5 is more accurate than the UatF lower bound by at least 94%.

A closed-form expression is required to propose a power allocation method for improving fairness based on the above proposed lower bound. However, the proposed lower bound expression is hard to apply immediately to optimization theory, since it is not a closed-form expression. Thus, the proposed lower bound expression is reformulated into a simple expression by approximation and then resource optimization is performed by using this.

First, an upper bound in the proposed lower bound expression for the ergodic transmission rate of the k-th user terminal 20 can be expressed by the following [Equation 16]:

[Equation 16]

$$R_k^{Prop} = \mathbb{E}\left[\log_2\left(\frac{|f_{k,k}|^2 + \sum_{k'\neq k}|f_{k,k'}|^2 + \left|\sum_{m=1}^{M} C_{mk}\hat{g}_{mk}^{H}\right|^2\sigma_w^2}{\sum_{k'\neq k}\mathbb{E}\,|f_{k,k'}|^2 + \mathbb{E}\left[\left|\sum_{m=1}^{M} C_{mk}\hat{g}_{mk}^{H}\right|^2\right]\sigma_w^2}\right) - \right.$$

$$\frac{1}{\tau_u}\log_2\left(1 + \frac{\tau_u\,\mathbb{V}\,[f_{k,k}]}{\sum_{k'\neq k}\mathbb{E}|f_{k,k'}|^2 + \mathbb{E}\left[\left|\sum_{m=1}^{M} C_{mk}\hat{g}_{mk}^{H}\right|^2\right]\sigma_w^2}\right) \leq$$

$$\log_2\left(1 + \frac{\mathbb{E}\,[|f_{k,k}|\hat{}2]}{\sum_{k'\neq k}\mathbb{E}|f_{k,k'}|^2 + \mathbb{E}\left[\left|\sum_{m=1}^{M} C_{mk}\hat{g}_{mk}^{H}\right|^2\right]\sigma_w^2}\right) -$$

$$\frac{1}{\tau_u}\log_2\left(1 + \frac{\tau_u\,\mathbb{V}[f_{k,k}]}{\sum_{k'\neq k}\mathbb{E}|f_{k,k'}|^2 + \mathbb{E}\left[\left|\sum_{m=1}^{M} C_{mk}\hat{g}_{mk}^{H}\right|^2\right]\sigma_w^2}\right)$$

where the inequality holds by the concavity of the log(·) function and the Jensen's inequality.

Next, the effective channel can be expressed by the following [Equation 17] to find the approximate value of $\mathbb{V}$ [$f_{k,k}$]:

[Equation 17]

$$f_{k,k} = \sum_{m=1}^{M}\sqrt{\rho_u\eta_k}\,C_{mk}\hat{g}_{mk}^{H}g_{mk} \approx \sum_{m=1}^{M}\sqrt{\rho_u\eta_k}\,C_{mk}g_{mk}^{H}g_{mk}$$

This approximation was obtained by assuming that there is no channel estimation error. Channel estimation errors are largely caused by two factors. The first one is a pilot contamination error, which is a channel estimation error that occurs when the pilot used by users has no orthogonality because the number of user terminals 20 is larger than the length of the pilot. The second one is an error in the channel estimator, which is an estimation error that occurs due to noise signals such as thermal noise at the time of channel estimation.

In cell-free massive MIMO, a variety of methods for reducing pilot contamination error have been proposed, and the number of user terminals 20 can be made smaller than the pilot length through multiple access. Thus, the assumption ignoring pilot contamination error is not unrealistic. Moreover, in general, high transmission power is used when transmitting a pilot, which makes the effect of the second error insignificant. Accordingly, the above approximation has quite a similar value as the actual value.

[Equation 17] is the summation of random variables having gamma distributions. Thus, by using the Welch Satterthwaite approximation, the cumulative probability density of $f_{k,k}$ can be approximated by the following [Equation 18]:

[Equation 18]

$$Pr[f_{k,k} \leq f] \approx \frac{1}{\Gamma(v_k)}\gamma\left(v_k, \frac{f}{w_k}\right)$$

where Γ(·) is the gamma function, γ(·) is the lower incomplete gamma function, and the shape parameter $v_k$ and the scale parameter $w_k$ are given the following [Equation 19]:

[Equation 19]

$$v_k = \frac{\left(\sum_{m=1}^{M} c_{mk}N\beta_{mk}\right)\hat{}2}{\sum_{m=1}^{M} C_{mk}^2 N\beta_{ml}^2},\; w_k = \sqrt{\rho_u\eta_k}\,\frac{\sum_{m=1}^{M} C_{mk}^2 N\beta_{ml}^2}{\sum_{m=1}^{M} c_{mk}N\beta_{mk}}$$

By using the property of gamma distribution, the distribution of $f_{k,k}$ can be expressed by the following [Equation 20]:

[Equation 20]

$$\mathbb{V}[f_{k,k}] \approx \frac{\mathbb{E}[|f_{kk}|^2]}{1 + v_k}$$

Next, in order to obtain the approximated lower bound of $\mathbb{V}$ [$f_{k,k}$], the upper bound of $v_k$ can be obtained by the following [Equation 21]:

[Equation 21]

$$\begin{aligned} v_k &= \frac{\left(\sum_{m=1}^{M} c_{mk}N\beta_{mk}\right)^2}{\sum_{m=1}^{M} C_{mk}^2 N\beta_{ml}^2} \\ &\leq \frac{\sum_{m=1}^{M} c_{mk}N\beta_{mk})^2}{\left(\min_m \beta_{mk}\right)\sum_{m=1}^{M} C_{mk}^2 N\beta_{mk}} \\ &= (a)\frac{\left(\sum_{m=1}^{M} c_{mk}N\beta_{mk}\right)^2}{\left(\min_m \beta_{mk}\right)\sum_{m=1}^{M} C_{mk}^2 N\beta_{mk}} \\ &= \frac{\sum_{m=1}^{M} c_{mk}N\beta_{mk}}{\min_m \beta_{mk}} \\ &\leq (b)\frac{\sum_{m=1}^{M} N\beta_{mk}}{\min_m \beta_{mk}} \end{aligned}$$

where (a) and (b) hold since $c_{mk}$ has a value of 0 or 1. By substituting [Equation 21] into [Equation 20], the following [Equation 22] can be obtained:

$$\mathbb{V}[f_{k,k}] \approx \frac{\mathbb{E}[|f_{kk}|^2]}{1+v_k} = \frac{\min_m \beta_{mk}}{\min_m \beta_{mk} + \sum_{m=1}^{M} N\beta_{mk}} \mathbb{E}[|f_{kk}|^2] \geq \min_k \left[ \frac{\min_m \beta_{mk}}{\min_m \beta_{mk} + \sum_{m=1}^{M} N\beta_{mk}} \right] \mathbb{E}[|f_{kk}|^2] \quad \text{[Equation 22]}$$

Using this, the approximated upper bound in the proposed lower bound expression for the Ergodic transmission rate can be expressed by the following [Equation 23].

$$R_k^{Prop} \lesssim R_k^{App.Up} \quad \text{[Equation 23]}$$

$$\log_2(1 + SINR_k^{Prorp}) - \frac{1}{\tau_u}\log_2(1 + SINR_k^{Prorp})$$

$$\text{where } \phi = \min_k \left[ \frac{\min_m \beta_{mk}}{\min_m \beta_{mk} + \sum_{m=1}^{M} N\beta_{mk}} \right],$$

and $$SINR_k^{Prop}$$

is as follows.

$$SINR_k^{Prop} = \frac{\mathbb{E}[|f_{kk}|^2]}{\sum_{k' \neq k} \mathbb{E}[|f_{kk}|^2] + \mathbb{E}\left[\left|\sum_{m=1}^{M} C_{mk}\hat{g}_{mk}^H\right|^2\right]\sigma_w^2} = \frac{\rho_U \eta_k \left[\sum_{m=1}^{M} C_{mk}N\gamma_{mk}\beta_{mk}^2 + \left(\sum_{m=1}^{M} C_{mk}N\gamma_{mk}\right)^{\wedge}2\right]}{\sum_{k' \neq k}\sum_{m=1}^{M} \rho_U \eta_{k'} C_{mk}N\gamma_{mk}\beta_{mk'} + \sum_{m=1}^{M} C_{mk}N\gamma_{mk}\sigma_w^2} \quad \text{[Equation 24]}$$

The problem about max-min power allocation and access point scheduling for improving fairness through the simplified expression [Equation 23] is defined by the following [Equation 25]:

$$\max_{\{\eta_k\},\{C_{mk}\}} \min_k R_k^{App.Up} \quad \text{[Equation 25]}$$

$$\text{s.t. } 0 \leq \eta_k \leq 1, \forall k$$

$$\sum_{m=1}^{M}\sum_{k=1}^{K} C_{mk} \leq MK\xi$$

$$C_{mk} \in \{0, 1\}, \forall m, k$$

where 0≤ξ≤1 is the element representing the constraint of fronthaul overhead, which means that, for ξ=1, every access point is available for information transmission of every user terminal 20.

The approximated upper bound $$(R_k^{App.Up})$$

in the proposed lower bound expression for the Ergodic transmission rate of the k-th user terminal 20 given by [Equation 23] is in proportion to $$SINR_k^{Prop},$$

the reason of which is because the first derivative of $$R_k^{App.Up}$$

has a positive value as show in [Equation 26]:

$$\frac{\partial R_k^{App.Up}}{\partial SINR_k^{Prop}} = \frac{1}{\ln 2}\left(\frac{1}{1 + SINR_k^{Prop}} - \frac{\phi}{1 + \phi\tau_u SINR_k^{Prop}}\right) = \frac{1}{\ln 2}\left(\frac{\phi(\tau_u - 1)SINR_k^{Prop} + 1 - \phi}{(1 + SINR_k^{Prop})(1 + \phi\tau_u SINR_k^{Prop})}\right) > 0 \quad \text{[Equation 26]}$$

where the last inequality holds since $\tau_u > 1$, and $0 \leq \Phi \leq 1$. With $$R_k^{App.Up}$$

being in proportion to $$SINR_k^{Prop},$$

the optimization problem in [Equation 25] can be reformulated by the following [Equation 27]:

$$\max_{\{\eta_k\},\{C_{mk}\}} \min_k SINR_k^{Prop} \quad \text{[Equation 27]}$$

$$\text{s.t. } 0 \leq \eta_k \leq 1, \forall k$$

$$\sum_{m=1}^{M}\sum_{k=1}^{K} C_{mk} \leq MK\xi$$

$$C_{mk} \in \{0, 1\}, \forall m, k$$

First, under the assumption that the access point scheduling scheme is given in [Equation 26], the power allocation problem for improving fairness is given by the following [Equation 28]:

$$\max_{\{\eta_k\}} \min_k SINR_k^{Prop} \quad \text{[Equation 28]}$$

$$\text{s.t. } 0 \leq \eta_k \leq 1, \forall k$$

To look at the properties of the objective function, let us define the upper-level set by the following [Equation 29]:

$$U(t) = \left\{\eta; \min_k SINR_k^{Prop} \geq t\right\} = \left\{\eta; SINR_k^{Prop} \geq t, \forall k\right. \quad \text{[Equation 29]}$$

-continued $$= \left\{ \eta;\ \frac{\rho_U \eta_k \left[ \sum_{m=1}^{M} C_{mk} N \gamma_{mk} \beta_{mk} + \left( \sum_{m=1}^{M} C_{mk} N \gamma_{mk} \right)^{\wedge} 2 \right]}{\sum_{k' \neq k} \sum_{m=1}^{M} \rho_U \eta_{k'} C_{mk} N \gamma_{mk} \beta_{mk'} + \sum_{m=1}^{M} C_{mk} N \gamma_{mk} \sigma_w^2} \geq t,\ \forall\, k \right.$$

$$= \left\{ \eta;\ \eta^T Z_k \geq t \sum_{m=1}^{M} C_{mk} N \gamma_{mk} \sigma_w^2,\ \forall\, k \right.$$

where $\eta = [\eta_1, \eta_2, \eta_3, \ldots, \eta_k]$, $z_k = [z_{k,1}, z_{k,2}, z_{k,3}, \ldots, z_{k,K}]$, and $$z_{k,i} = \begin{cases} \rho_u \left[ \sum_{m=1}^{M} c_{mk} N \gamma_{mk} \beta_{mk} + \left( \sum_{m=1}^{M} c_{mk} N \gamma_{mk} \right)^2 \right], & i = k \\ -t \sum_{m=1}^{M} \rho_u c_{mk} N \gamma_{mk} \beta_{mk'}, & i \neq k \end{cases}$$

In this case, the upper-level set is a convex set for every t, and thus the objective function is a quasi-concave function.

The objective function of this optimization problem is a quasi-concave function, and the constraint function is a linear function. Thus, the optimization problem in [Equation 28] is a quasi-concave optimization problem, which can be solved with "Convex feasibility problems with bisection method".

Next, when a power allocation scheme is given, the problem about the access point scheduling scheme for improving fairness can be defined by the following [Equation 30]:

$$\max_{\{C_{mk}\}} \min_k SINR_k^{Prop} \quad \text{[Equation 30]}$$

$$\text{s.t. } \sum_{m=1}^{M} \sum_{k=1}^{K} C_{mk} \leq MK\xi$$

$$c_{mk} \in \{0, 1\},\ \forall\, m, k$$

The problem about the access point scheduling scheme cannot use the existing optimization algorithm because of the two reasons: first, the last constraint function is not a convex set, and second, the objective function is neither a concave function nor a quasi-concave function.

To solve the first problem, the problem is reformulated as in the following [Equation 31] by relaxing the Boolean constraint:

$$\max_{\{C_{mk}\}} \min_k SINR_k^{Prop} \quad \text{[Equation 31]}$$

$$\text{s.t. } \sum_{m=1}^{M} \sum_{k=1}^{K} C_{mk} \leq MK\xi$$

$$0 \leq c_{mk} \leq 1,\ \forall\, m, k$$

To solve the second problem, as an alternative to the method of finding an optimum for this optimization problem, motivated by SCA (Successive Convex Approximation) which is used to solve the existing non-convex problem, we proposes an algorithm for finding an local optimum by solving the sequence of a problem approximate to an optimization problem that can be dealt with easily.

First, by using the first-order Taylor series at the (n+1)th iteration, the objective function in [Equation 31] can be expressed by the following [Equation 32]:

$$\min_k SINR_k^{Prop} = \min_k \frac{\rho_U \eta_k \left[ \sum_{m=1}^{M} C_{mk} N \gamma_{mk} \beta_{mk} + \left( \sum_{m=1}^{M} C_{mk} N \gamma_{mk} \right)^{\wedge} 2 \right]}{\sum_{k' \neq k} \sum_{m=1}^{M} \rho_U \eta_{k'} C_{mk} N \gamma_{mk} \beta_{mk'} + \sum_{m=1}^{M} C_{mk} N \gamma_{mk} \sigma_w^2} \quad \text{[Equation 32]}$$

$$= \min_k \frac{\eta_k (\gamma_k \otimes \beta_{k'})^T C_k + N \eta_k \left( \gamma_k^T c_k \right)^2}{\left( \sum_{k' \neq k} \eta_{k'} (\gamma_k \otimes \beta_{k'})^T + \frac{\sigma_w^2}{\rho_u} \gamma_k^T \right) C_k}$$

$$\geq \min_k \frac{\eta_k (\gamma_k \otimes \beta_{k'})^T c_k + N \eta_k \left( \left( \gamma_k^T c_k^{[n]} \right)^{\wedge} 2_k + 2 c_k^{[n]} \left( c_k - c_k^{[n]} \right) \right)}{\left( \sum_{k' \neq k} \eta_{k'} (\gamma_k \otimes \beta_{k'})^T + \frac{\sigma_w^2}{\rho_u} \gamma_k^T \right) C_k}$$

where $$\gamma_k = [\gamma_{1,k}, \gamma_{2,k}, \ldots, \gamma_{M,k}]^T \in \mathbb{C}^{M \times 1},$$

$$\beta_k = [\beta_{1,k}, \beta_{2,k}, \ldots, \beta_{M,k}]^T \in \mathbb{C}^{M \times 1}, \text{ and}$$

$$c_k = [c_{1,k}, c_{2,k}, \ldots, c_{M,k}]^T \in \mathbb{C}^{M \times 1}.$$

It can be seen that the objective function reformulated by the Taylor series is a quasi-concave function in a similar manner to [Equation 29]. Thus, by using [Equation 32] and a slack variable t, the optimization problem can be reformulated by the following [Equation 33]:

$$\max_{\{C_{mk}\}} \min_k \frac{\eta_k (\gamma_k \otimes \beta_{k'})^T c_k + N \eta_k \left( \left( \gamma_k^T c_k^{[n]} \right)^{\wedge} 2_k + 2 c_k^{[n]} \left( c_k - c_k^{[n]} \right) \right)}{\left( \sum_{k' \neq k} \eta_{k'} (\gamma_k \otimes \beta_{k'})^T + \frac{\sigma_w^2}{\rho_u} \gamma_k^T \right) C_k} \quad \text{[Equation 33]}$$

$$\text{s.t. } \sum_{m=1}^{M} \sum_{k=1}^{K} C_{mk} \leq MK\xi$$

$$0 \leq c_{mk} \leq 1,\ \forall\, m, k$$

The [Equation 33] problem is an epigraph form and can be given by the following [Equation 34]:

$$\max_{\{C_{mk}\}, t} t \quad \text{[Equation 34]}$$

$$\text{s.t. } \eta_k (\gamma_k \otimes \beta_{k'})^T c_k + N \eta_k \left( \left( \gamma_k^T c_k^{[n]} \right)^{\wedge} 2_k + 2 c_k^{[n]} \left( c_k - c_k^{[n]} \right) \right) \geq t \left( \sum_{k' \neq k} \eta_{k'} (\gamma_k \otimes \beta_{k'})^T + \frac{\sigma_w^2}{\rho_u} \gamma_k^T \right) C_k$$

$$\text{s.t. } \sum_{m=1}^{M} \sum_{k=1}^{K} C_{mk} \leq MK\xi$$

$$0 \leq c_{mk} \leq 1,\ \forall\, m, k$$

[Equation 34] is a quasi-concave optimization problem, which can be solved by "Convex feasibility problems with bisection method". A local optimum obtained based on this algorithm is set as the initial value of the Taylor series at the next iteration, and the process is repeated until the objective function converges. This process is summed up in Algorithm 1 below.

Algorithm 1

Initialize $n \leftarrow 0$, $\{c_k^{[0]}; \forall k\}$, $t^{[0]}$, $\epsilon$
repeat
    $n \leftarrow n + 1$
    Solve (16) based on $\{c_k^{[n-1]}; \forall k\}$ and get $t^*$ and $c_k^*$, $\forall k$
    Update $t^{[n]} \leftarrow t^*$ and $c_k^{[n]} \leftarrow c_k^* \forall k$
until $\left| \frac{t^{[n]} - t^{[n-1]}}{t^{[n-1]}} \right| \le \epsilon$
for $k = 1$ do K do
    $w_k = \lceil \Sigma_{m=1}^{M} c_{mk} \rfloor$
    Sorting the $c_k^*$ in a descending way as $c_{\delta(1),k}^* \ge c_{\delta(2),k}^* \ldots \ge c_{\delta(M),k}^*$
    for $m = 1$ do M do
        if $m \ge \delta(w_k)$ then
            Set $c_{mk} = 1$
        else
            Set $c_{mk} = 0$
        end if
    end for
end for The aforementioned respective resource allocation methods are subordinate to each other, the optimization of the two resources should be done simultaneously. However, the simultaneous optimization of the two resources is considerably complicated, and therefore the present disclosure proposes a method of jointly optimizing two resources through an iterative method which is often used for the joint optimization of subordinate resources with low complexity.

More specifically, an optimum power allocation technique is applied on the assumption that access point scheduling is given. An access point scheduling algorithm is applied based on allocated power. A joint optimum for two resources can be obtained by performing this method until the objective function converges.

To analyze the effects of the proposed new measure and power allocation and access point scheduling, results from various tests are shown in FIGS. 6 and 7. It was assumed that the network size is 300×300 m, and it is also assumed that an access point has a total of 200 single antennas and a user terminal has 20 single antennas. And, the distribution of access points assumes "Piazza" and "Random topology". The other test environments not mentioned are the same as mentioned in the iterative method used for the joint optimization of subordinate resources with low complexity.

Figure 6A:
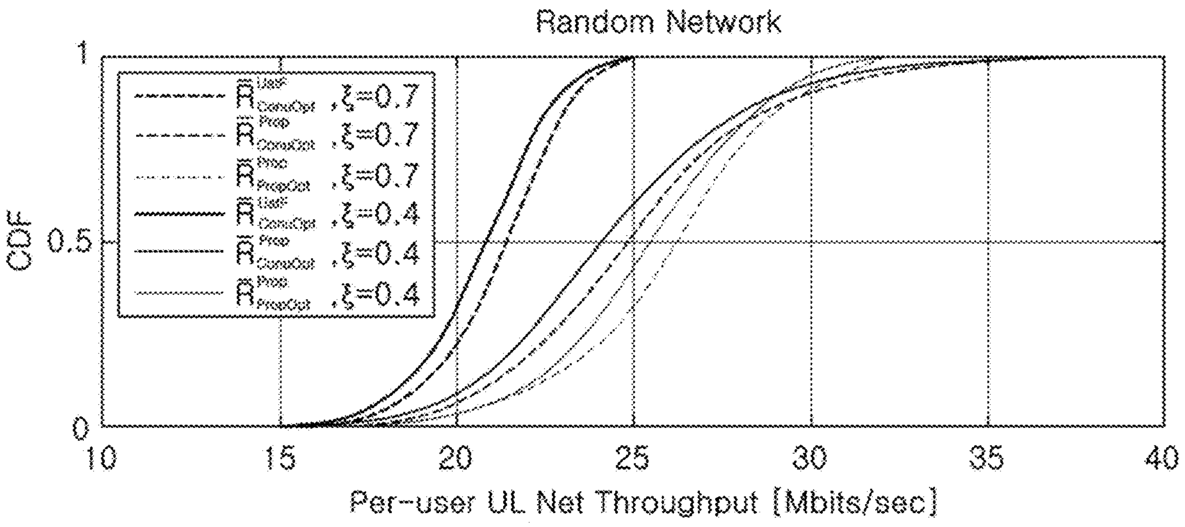
FIGS. 6A and 6B are graphs showing cumulative distribution functions for performance according to a conventional measure and power allocation method based on an intuitive AP scheduling (LLSF) and for performance according to a measure and power allocation method according to an embodiment of the present disclosure.
Figure 6B:
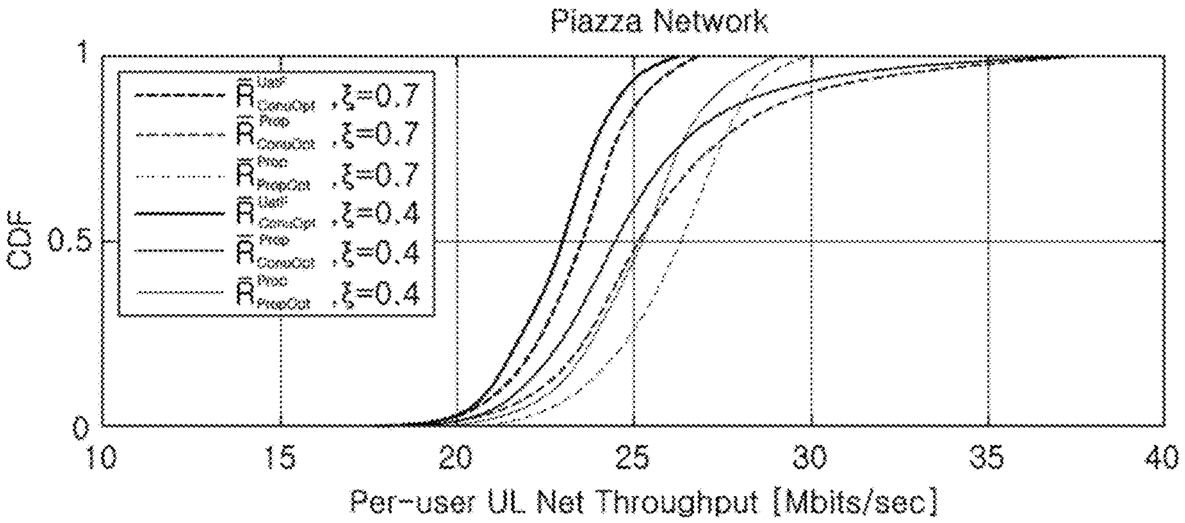

In FIGS. 6A and 6B, the access point scheduling method uses an intuitive LLSF (Largest Large-scale Fading) algorithm, in which the blue graph uses the existing power allocation method and the existing measure for performance evaluation, and the red graph uses the power allocation method proposed in the present disclosure and the proposed measure for performance evaluation. The black graph uses the existing power allocation method and the proposed measure for performance evaluation. The dotted line graph shows that service is provided to each user terminal by utilizing, on average, 70% of the access points within the entire network ($\xi$=0.4). Referring to FIGS. 6A and 6B, it is observed that the proposed measure for performance evaluation has a higher value in most cases. Since both of the two measures are lower bounds, it can be construed that the lower bound with a higher value reflects the actual value better. Thus, it can be found out that the proposed measure for performance evaluation and the proposed power allocation method are more effective than the existing scheme. Moreover, it is observed that "Piazza topology" has less gain in the proposed scheme compared to "Random topology". This is because the channel hardening effect is better with "Piazza topology".

Figure 7A:
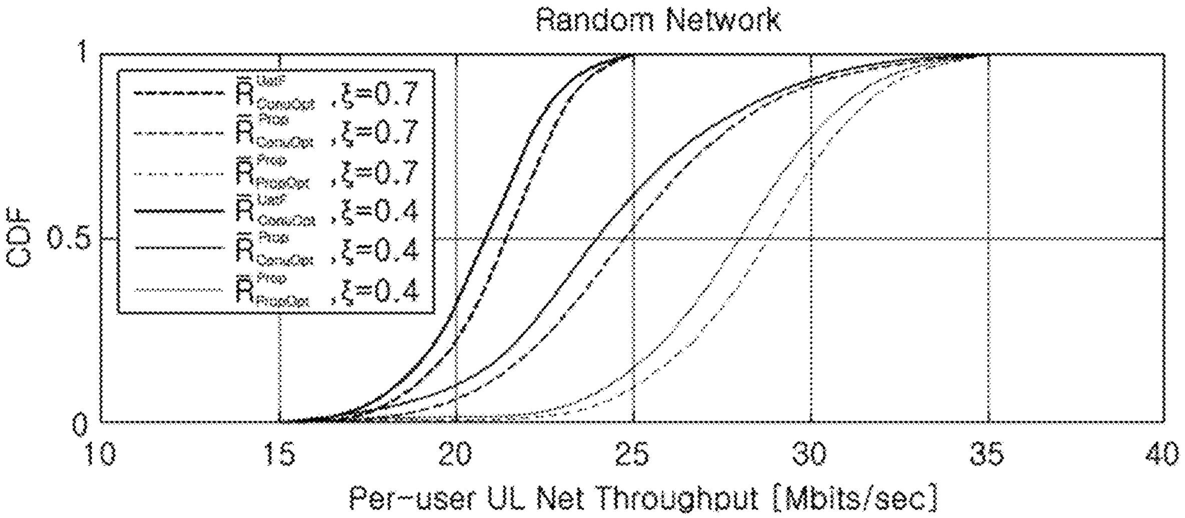
FIGS. 7A and 7B are graphs showing cumulative distribution functions for performance according to a conventional measure-based power allocation and AP scheduling method and for performance according to a measure-based power allocation and AP scheduling method according to an embodiment of the present disclosure.
Figure 7B:
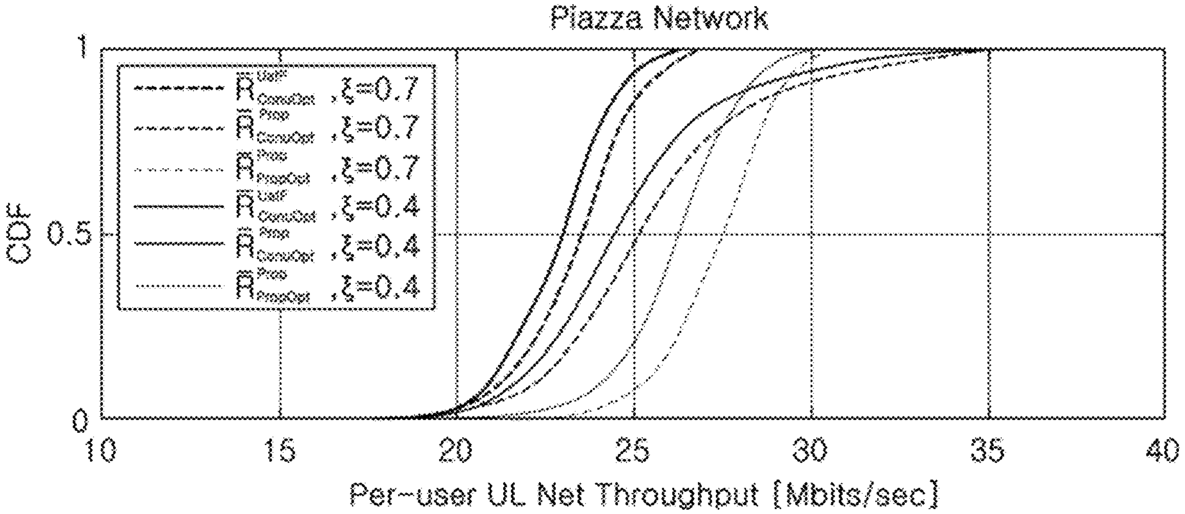

FIGS. 7A and 7B depict cumulative distribution functions for performance between the scheme proposed in the present disclosure and the existing scheme. They are the same as shown previously in the blue, red, and black graphs of FIG. 6, and the dotted lines and the solid lines indicate that the percentage of access points in the network that provide service to a single user is 70% and 40%, on average, respectively. From these simulation results, it can be seen that a considerable improvement in performance can be achieved through the measure and resource distribution algorithm proposed in the present disclosure, and the importance of an access point scheduling algorithm, as well as power allocation, can be seen.

To sum up, the measure for performance evaluation proposed in the present disclosure overcomes the problem that the existing performance evaluation measure assuming channel hardening underestimates actual performance, and therefore enables accurate evaluations of communication capacity. In addition, based on a new measure that reflects actual performance better, a power and access point scheduling method for providing high performance uniformly to every user are proposed to develop more efficient resource distribution method.

As described above, an embodiment of the present disclosure implements a power allocation and AP scheduling technique for improving fairness based on a measure for performance evaluation without channel hardening, provides fair performance to receivers using a single antenna, especially in an up-link cell-free massive MIMO system, proposes a new measure that improves the problems with the existing performance evaluation, and, based on this, implements a power allocation and AP scheduling technique for providing uniform performance to every user.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A resource management apparatus in a cell-free massive MIMO (Multi-Input Multi-Output) network system, the apparatus comprising:

- a transceiver configured to receive communication information from access points distributed on a fronthaul network of the cell-free massive MIMO network system;
- a memory configured to store one or more instructions; and
- a processor configured to execute the one or more instructions stored in the memory, wherein the instructions, when executed by the processor, cause the processor to:
- control the transceiver to allocate transmission power information based on the communication information;
- set access point scheduling information based on the transmission power information; and
- transmit the transmission power information and the access point scheduling information to the access points,
- wherein the processor is configured to receive data of a user terminal based on the access point scheduling information and to decode the received data,
- wherein the instructions include an algorithm for allocating the transmission power information and scheduling the access point scheduling information,
- wherein the processor is configured to implement the algorithm to allocate the transmission power information and set the access point scheduling information,
- wherein the processor is configured to calculate a lower bound on an Ergodic transmission rate without channel hardening through the algorithm, and allocate the transmission power information based on the calculated lower bound, and
- wherein the processor is configured to calculate an average ratio between a UatF (Use-and then Forget) lower bound and the lower bound of the Ergodic transmission rate.

2. The resource management apparatus of claim 1, wherein the processor is configured to obtain the lower bound on the Ergodic transmission rate in a closed-form expression.

3. The resource management apparatus of claim 1, wherein the processor is configured to set the access point scheduling information by setting a local optimum based on the transmission power information.

4. The resource management apparatus of claim 1, wherein the communication information includes at least one of location information of the user terminal, information on a channel estimation scheme of the access point, and maximum transmission power.

5. A resource management method to be processed by a resource management apparatus in a cell-free massive MIMO (Multi-Input Multi-Output) network system, the method comprising:

- receiving communication information from an access point;
- allocating transmission power information based on the communication information;
- setting scheduling information of the access point based on the transmission power information;
- transmitting the transmission power information and scheduling information to the access point;
- receiving device data of a user terminal from the access point based on the scheduling information; and
- decoding the received device data,
- wherein the allocating of the transmission power information includes:
  - calculating a lower bound on an Ergodic transmission rate without channel hardening; and
  - allocating the transmission power information based on the calculated lower bound on the Ergodic transmission rate, and
- wherein the calculating of the lower bound on the Ergodic transmission rate includes calculating an average ratio between a UatF (Use-and then Forget) lower bound and the lower bound of the Ergodic transmission rate.

6. The resource management method of claim 5, wherein the device data is generated by transmitting data by the user terminal based on the transmission power information.

7. The resource management method of claim 5, wherein the calculating of the lower bound on the Ergodic transmission rate includes obtaining the lower bound on the Ergodic transmission rate in a closed-form expression.

8. The resource management method of claim 5, wherein the setting of the scheduling information includes setting the access point scheduling information by setting a local optimum based on the transmission power information.

9. The resource management method of claim 5, wherein the communication information includes at least one of location information of the user terminal, information on a channel estimation scheme of the access point, and maximum transmission power.

10. A non-transitory computer readable storage medium storing computer executable instructions, wherein the instructions, when executed by a processor, cause the processor to perform a resource management method, the method comprising:

- receiving communication information from an access point;
- allocating transmission power information based on the communication information;
- setting scheduling information of the access point based on the transmission power information;
- transmitting the transmission power information and scheduling information to the access point;
- receiving device data of a user terminal from the access point based on the scheduling information; and
- decoding the received device data,
- wherein the allocating of the transmission power information includes:
  - calculating a lower bound on an Ergodic transmission rate without channel hardening; and allocating the transmission power information based on the calculated lower bound on the Ergodic transmission rate, and wherein the calculating of the lower bound on the Ergodic transmission rate includes calculating an average ratio between a UatF (Use-and then Forget) lower bound and the lower bound of the Ergodic transmission rate.

11. The non-transitory computer readable storage medium of claim 10, wherein the device data is generated by transmitting data by the user terminal based on the transmission power information.

12. The non-transitory computer readable storage medium of claim 10, wherein the calculating of the lower bound on the Ergodic transmission rate includes obtaining the lower bound on the Ergodic transmission rate in a closed-form expression.

13. The non-transitory computer readable storage medium of claim 10, wherein the setting of the scheduling information includes setting the access point scheduling information by setting a local optimum based on the transmission power information.

* * * * *